United States Patent
Huang et al.

(10) Patent No.: US 11,232,246 B2
(45) Date of Patent: Jan. 25, 2022

(54) LAYOUT-FRIENDLY TEST PATTERN DECOMPRESSOR

(71) Applicant: Siemens Industry Software Inc., Plano, TX (US)

(72) Inventors: Yu Huang, West Linn, OR (US); Janusz Rajski, West Linn, OR (US); Mark A. Kassab, Wilsonville, OR (US); Nilanjan Mukherjee, Wilsonville, OR (US); Jeffrey Mayer, Wilsonville, OR (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/082,462

(22) Filed: Oct. 28, 2020

(65) Prior Publication Data

US 2021/0150112 A1    May 20, 2021

Related U.S. Application Data

(60) Provisional application No. 62/935,256, filed on Nov. 14, 2019.

(51) Int. Cl.
*G06F 30/33* (2020.01)
*G06F 30/333* (2020.01)
(Continued)

(52) U.S. Cl.
CPC ............ *G06F 30/333* (2020.01); *H01L 25/00* (2013.01); *H03K 19/091* (2013.01);
(Continued)

(58) Field of Classification Search
CPC ...... G06F 30/33; G06F 30/333; G06F 30/398; G06F 2119/02; G06F 2111/10;
(Continued)

(56) References Cited

U.S. PATENT DOCUMENTS 6,327,687 B1   12/2001   Rajski et al.
6,353,842 B1    3/2002   Rajski et al.
(Continued)

OTHER PUBLICATIONS

Sakthivel et al., "Low Transition Test Pattern Generator Architecture for Buil-in-Self-Test", American Journal of Applied Sciences 9, pp. 1396-1406, 2012. (Year: 2012).*
(Continued)

*Primary Examiner* — Phallaka Kik

(57) ABSTRACT

A circuit comprises: a register configured to be a linear finite state machine and comprising storage elements, injection devices, one or more input channels for injecting variables using the injection devices, and one or more feedback devices; a plurality of phase shifters, each of the plurality of phase shifters configured to receive signals from a unique segment of the register; scan chains, serial inputs of the scan chains configured to receive signals from outputs of the plurality of phase shifters, wherein the one or more input channels are coupled to the injection devices at injection points in the register, each of the injection points being assigned to one of the one or more input channels based on lifespan values for the injection points, the injection points being determined based on one or more predetermined requirements.

18 Claims, 15 Drawing Sheets

Flow chart
500

(51) Int. Cl.
  *G06F 30/398* (2020.01)
  *H01L 25/00* (2006.01)
  *H03K 19/091* (2006.01)
  *H03K 19/173* (2006.01)
  *G06F 111/10* (2020.01)
  *G06F 119/02* (2020.01)

(52) U.S. Cl.
  CPC ........ *H03K 19/173* (2013.01); *G06F 2111/10* (2020.01); *G06F 2119/02* (2020.01)

(58) Field of Classification Search
  CPC ...... H01L 25/00; H03K 19/00; H03K 19/091; H03K 19/173
  USPC ....... 716/136, 106, 111; 703/15; 326/14, 16, 326/41, 101
  See application file for complete search history.

(56) References Cited

U.S. PATENT DOCUMENTS

| | | | |
|---|---|---|---|
| 6,539,409 B2 | 3/2003 | Rajski et al. | |
| 6,543,020 B2 | 4/2003 | Rajski et al. | |
| 6,557,129 B1 | 4/2003 | Rajski et al. | |
| 6,684,358 B1 | 1/2004 | Rajski et al. | |
| 6,708,192 B2 | 3/2004 | Rajski et al. | |
| 6,829,740 B2 | 12/2004 | Rajski et al. | |
| 6,874,109 B1* | 3/2005 | Rajski | G01R 31/31813 714/726 |
| 7,093,175 B2 | 8/2006 | Rajski et al. | |
| 7,111,209 B2 | 9/2006 | Rajski et al. | |
| 7,260,591 B2 | 8/2007 | Rajski et al. | |
| 7,263,641 B2 | 8/2007 | Rajski et al. | |
| 7,478,296 B2 | 1/2009 | Rajski et al. | |
| 7,493,540 B1 | 2/2009 | Rajski et al. | |
| 7,500,163 B2 | 3/2009 | Rajski et al. | |
| 7,506,232 B2 | 3/2009 | Rajski et al. | |
| 7,509,546 B2 | 3/2009 | Rajski et al. | |
| 7,523,372 B2 | 4/2009 | Rajski et al. | |
| 7,647,540 B2* | 1/2010 | Rajski | G01R 31/318547 714/738 |
| 7,653,851 B2 | 1/2010 | Rajski et al. | |
| 8,112,686 B2* | 2/2012 | Hapke | G01R 31/318558 714/733 |
| 2007/0164971 A1* | 7/2007 | Chang | H03K 23/54 345/100 |
| 2007/0234150 A1* | 10/2007 | Jain | G01R 31/318544 714/726 |
| 2008/0052578 A1* | 2/2008 | Rajski | G01R 31/318335 714/729 |
| 2008/0052586 A1* | 2/2008 | Rajski | G01R 31/31921 714/741 |
| 2009/0300446 A1* | 12/2009 | Rajski | G01R 31/318547 714/726 |

OTHER PUBLICATIONS

K. Chakravadhanula et al., "Advancing Test Compression to the Physical Dimension," Proc. International Test Conference, 2017, Paper 10.2, pp. 1-10.

J. Rajski et al., "Embedded Deterministic Test," IEEE Transactions on Computer-Aided Design of Integrated Circuits and Systems, vol. 23, No. 5, May 2004, pp. 776-792.

* cited by examiner

Flow chart 500

```
for each channel {
    traverse the 2D map from one segment to the next,
    pick injectors diagonally,
    one from each segment,
    until it reaches its targeted number of injectors ;
}
```

FIG. 7

| Design | Number of Gates | Number of Scan Cells | Input Channels | Output Channels | Scan Chains | Chain Length | Input Compression Ratio |
|---|---|---|---|---|---|---|---|
| D1 | 17M | 566K | 20 | 4 | 6000 | 95 | 300X |
| D2 | 8.4M | 457K | 6 | 4 | 2625 | 175 | 438X |
| D3 | 3.9M | 197K | 7 | 3 | 1196 | 166 | 171X |
| D4 | 14M | 776K | 10 | 10 | 2850 | 273 | 285X |
| D5 | 2.5M | 194K | 6 | 2 | 1167 | 167 | 195X |
| D6 | 9.9M | 440K | 10 | 5 | 4419 | 100 | 442X |
| D7 | 6.7M | 294K | 4 | 4 | 1545 | 191 | 386X |
| D8 | 3.6M | 207K | 4 | 2 | 1125 | 185 | 281X |
| D9 | 13M | 898K | 8 | 2 | 3163 | 285 | 395X |

FIG. 11

| Design | Single Decompressor | | Layout-Friendly Segmented Decompressor | |
|---|---|---|---|---|
| | Test Coverage | Pattern Count | Test Coverage (delta) | Pattern Count (Reduction Ratio) |
| D1 | 94.96% | 9284 | 94.96% (0.00) | 8754 (1.06X) |
| D2 | 98.31% | 31876 | 98.28% (-0.03) | 29544 (1.08X) |
| D3 | 90.16% | 33940 | 89.91% (-0.25) | 34010 (1.00X) |
| D4 | 99.58% | 57277 | 99.64% (+0.06) | 55020 (1.04X) |
| D5 | 99.21% | 89076 | 99.21% (0.00) | 89748 (0.99X) |
| D6 | 93.40% | 53588 | 93.51% (+0.11) | 50687 (1.06X) |
| D7 | 93.25% | 71506 | 93.25% (0.00) | 71401 (1.00X) |
| D8 | 98.55% | 31301 | 98.56% (+0.01) | 29253 (1.07X) |
| D9 | 99.67% | 31684 | 99.66% (-0.01) | 28383 (1.12X) |
| Average | | | -0.01% | 1.05X |

FIG. 12

LAYOUT-FRIENDLY TEST PATTERN DECOMPRESSOR

RELATED APPLICATIONS

This application claims the benefit of U.S. Provisional Patent Application No. 62/935,256, filed on Nov. 14, 2019, which application is incorporated entirely herein by reference.

FIELD OF THE DISCLOSED TECHNIQUES

The presently disclosed techniques relates to circuit testing. Various implementations of the disclosed techniques may be particularly useful for reducing the routing congestion associated with test compression circuits.

BACKGROUND OF THE DISCLOSED TECHNIQUES

Test compression is widely recognized as instrumental in reducing the overall cost of scan-based semiconductor device testing. With aggressive technology scaling, test stimuli compression along with test response compaction plays a key role in handling test data volume growth. The development of test compression schemes reflects ever-changing needs of many applications and addresses insatiable consumer demands for greater performance at a lower cost.

The compression hardware architecture includes logic circuitry inserted on the scan path. The logic circuitry typically has two main blocks: an on-chip decompressor that feeds test stimuli, derived from a small number of scan input channels, to a large number of scan chains, and one or multiple on-chip compactors that compact test responses captured and shifted out of the scan chains to a small number of scan output channels. Unlike compactors that can be associated with only a subset of scan chains, a centralized decompressor often drives thousands or even tens of thousands of scan chains. This can lead to severe routing congestion in a large design. Designers need to consider layout constraints during the design of decompressors. K. Chakravadhanula et al. disclosed a two-dimensional layout-aware test compression technique in "Advancing Test Compression to the Physical Dimension," Proc. International Test Conference, 2017, Paper 10.2. This technique, however, has limitations because the layout of scan chains is typically unavailable yet when designers insert compression logic circuitry into designs at the register-transfer level (RTL). Even at the gate-level, the detailed layout may not be known. It is thus desirable to search for a decompression technology that can be inherently layout friendly and also do not sacrifice test coverage or test data volume.

BRIEF SUMMARY OF THE DISCLOSED TECHNIQUES

Various aspects of the disclosed technology relate to segmented decompressor designs. In one aspect, there is a circuit, comprising: a register configured to be a linear finite state machine and comprising storage elements, injection devices, one or more input channels for injecting variables using the injection devices, and one or more feedback devices; a plurality of phase shifters, each of the plurality of phase shifters configured to receive signals from a unique segment of the register; scan chains, serial inputs of the scan chains configured to receive signals from outputs of the plurality of phase shifters, wherein the one or more input channels are coupled to the injection devices at injection points in the register, each of the injection points being assigned to one of the one or more input channels based on lifespan values for the injection points, the injection points being determined based on one or more predetermined requirements, a life span value for an injection point in a specific segment of the register being a number of clock cycles for which a variable injected at the injection point can provide encoding capacity to scan chains associated with the specific segment of the register before being shifted out of the specific segment of the register.

The register may be a ring generator. At least one segment of the register providing signals to a phase shifter in the plurality of phase shifters may contain two groups of bits, bits in each of the two groups of storage elements forming a shift register, the shift register having one or more of the injection points, one or more points for inserting the feedback devices, or both.

The injection devices and the feedback devices may be XOR gates. Each of the plurality of phase shifters may comprise XOR gates.

The one or more predetermined requirements may comprise: a requirement that a feedback device and an injection device should not be located at the same location between two neighboring storage elements of the register, a requirement that any two of the injection devices should be separated by at least two neighboring storage elements of the register, or both.

The injection points in each segment of the register may be assigned to different input channels if a number of the injection points in the each segment of the register is less than or equal to a number of the one or more input channels, or each of the one or more input channels may be assigned to at least one of the injection points in each segment of the register if the number of the injection points in the each segment of the register is greater than the number of the one or more input channels.

The assignment of the injection points to the one or more input channels may employ a diagonal search method on a two-dimensional map which groups the injection points in each of the segments of the register in one of columns or rows of the two-dimensional map, the injection points in each of the columns or rows being ordered according to the life span values of the injection points.

Each of the one or more input channels may be assigned to at least one of the injection points in each segment of the register, and sums of the life span values for the injection points may be equal for the one or more input channels.

In another aspect, there are one or more non-transitory computer-readable media storing computer-executable instructions for causing one or more processors to perform a method, the method comprising: creating a circuit in a circuit design for testing a chip fabricated according to the circuit design.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed techniques. Thus, for example, those skilled in the art will recognize that the disclosed techniques may be embodied or carried out in a manner that

BRIEF DESCRIPTION OF THE DRAWINGS

FIG. 7 illustrates an example of a pseudo code for assigning injection points to input channels that may be employed according to various examples of the disclosed technology.

FIG. 11 illustrates a table listing parameters for nine industrial designs.

FIG. 12 illustrates an example of ATPG results for each of the nine industrial designs.

DETAILED DESCRIPTION OF THE DISCLOSED TECHNIQUES

General Considerations

Various aspects of the disclosed technology relate to segmented decompressor designs. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

The detailed description of a method or a device sometimes uses terms like "couple" and "assign" to describe the disclosed method or the device function/structure. Such terms are high-level descriptions. The actual operations or functions/structures that correspond to these terms will vary depending on the particular implementation and are readily discernible by one of ordinary skill in the art.

Additionally, as used herein, the term "design" is intended to encompass data describing an entire integrated circuit device. This term also is intended to encompass a smaller group of data describing one or more components of an entire device such as a portion of an integrated circuit device nevertheless.

Illustrative Operating Environment

Figure 1:
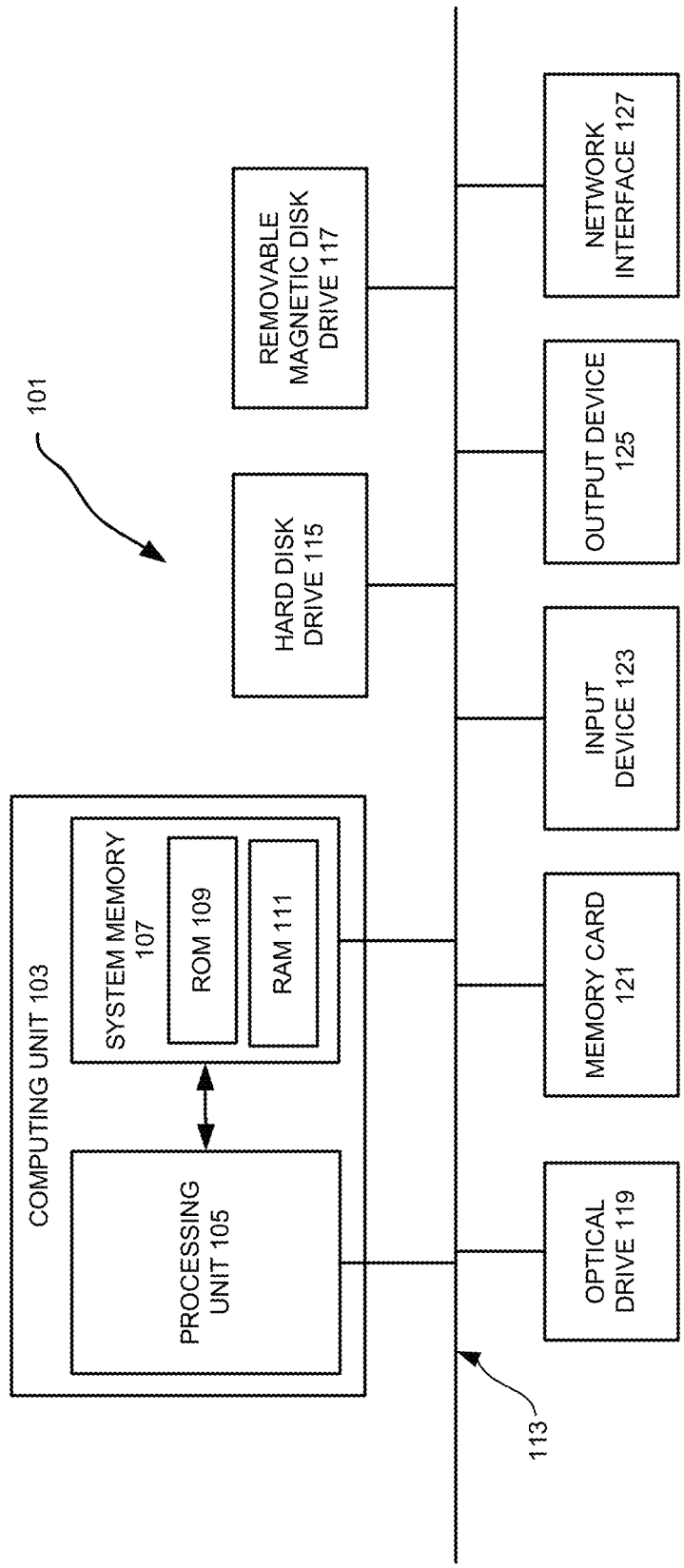
FIG. 1 illustrates a programmable computer system with which various embodiments of the disclosed technology may be employed.

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but it will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it is not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multi-processor computer, a plurality of single and/or multiprocessor computers arranged into a network, or some combination of both.

Design for Test, Test Pattern Generation, and Testing

The reduction in feature size increases the probability that a manufacture defect in the integrated circuit will result in a faulty chip. A very small defect can result in a faulty transistor or interconnecting wire. Even a single faulty transistor or wire can cause the entire chip to function improperly. Manufacture defects are unavoidable nonetheless, no matter whether the manufacturing process is at the prototype stage or the high-volume manufacturing stage. It is thus necessary to test chips during the manufacturing process. Diagnosing faulty chips is also needed to ramp up and to maintain the manufacturing yield.

Testing typically includes applying a set of test stimuli (test patterns) to the circuit-under-test and then analyzing responses generated by the circuit-under-test. Functional testing attempts to validate that the circuit-under-test operates according to its functional specification while structural testing tries to ascertain that the circuit-under-test has been assembled correctly from some low-level building blocks as specified in a structural netlist and that these low-level building blocks and their wiring connections have been manufactured without defect. For structural testing, it is assumed that if functional verification has shown the correctness of the netlist and structural testing has confirmed the correct assembly of the structural circuit elements, then the circuit should function correctly. Structural testing has been widely adopted at least in part because it enables the test (test pattern) generation to focus on testing a limited number of relatively simple circuit elements rather than having to deal with an exponentially exploding multiplicity of functional states and state transitions.

To make it easier to develop and apply test patterns, certain testability features are added to circuit designs, which is referred to as design for test or design for testability (DFT). Scan testing is the most common DFT method. In a basic scan testing scheme, all or most of internal sequential state elements (latches, flip-flops, et al.) in a circuit design are made controllable and observable via a serial interface. These functional state elements are usually replaced with dual-purpose state elements called scan cells. Scan cells are connected together to form scan chains—serial shift registers for shifting in test patterns and shifting out test responses. A scan cell can operate as originally intended for functional purposes (functional/mission mode) and as a unit in a scan chain for scan (scan mode). A widely used type of scan cell includes an edge-trigged flip-flop with two-way multiplexer for the data input. The two-way multiplexer is typically controlled by a single control signal called scan_enable, which selects the input signal for a scan cell from either a scan signal input port or a system signal input port. The scan signal input port is typically connected to an output of another scan cell while the system signal input port is connected to the functional logic. Scan cells can serve as both a control point and an observation point. Control points can be used to set certain logic values at some locations of the circuit-under-test, exciting (activating) a fault and propagating the incorrect value to an observation point. Scan testing allows the test equipment to access gates deeply embedded through the primary inputs/outputs and/or some physical test points and can remove the need for complicated state transition sequences when trying to control or observe what is happening at some internal circuit element.

Test patterns for scan testing are typically generated through an automatic test pattern generation (ATPG) process. ATPG usually focuses on a set of faults derived from a gate-level fault model. A defect is a flaw or physical imperfection caused in a device during the manufacturing process. A fault model (or briefly a fault) is a description of how a defect alters design behavior. For a given target fault, ATPG comprises two phases: fault activation and fault propagation. Fault activation establishes a signal value at the fault site opposite that produced by the fault. Fault propagation propagates the fault effect forward by sensitizing a path from a fault site to a scan cell or a primary output. A fault at a site is said to be detected by a test pattern if a test response value captured by a scan cell or a primary output is different than the expected value. The objective of ATPG is to find a test pattern that, when applied to the circuit, enables testers to distinguish between the correct circuit behavior and the faulty circuit behavior caused by one or more particular faults. Effectiveness of ATPG is measured by the fault coverage achieved for the fault model and the number of generated vectors (test pattern counts), which should be directly proportional to test application time. Here, the fault coverage is defined as a ratio of the number of detected faults vs. the total number of faults.

The most popular fault model used in practice is the single stuck-at fault model. In this model, one of the signal lines in a circuit is assumed to be stuck at a fixed logic value, regardless of what inputs are supplied to the circuit. The stuck-at fault model is a logical fault model because no delay information is associated with the fault definition. Delay faults cause errors in the functioning of a circuit based on its timing. They are caused by the finite rise and fall time periods of the signals in the gates, as well as, the propagation delay of interconnects between the gates. Transition faults are used for their simplicity in modeling spot defects that affect delays at inputs or outputs of gates. Under scan-based tests, the transition faults are associated with an extra delay that is large enough to cause the delay of any path through the fault site to exceed the clock period. Cell internal fault models can be derived using transistor-level circuit simulations (analog simulations). This approach can pinpoint the defect location within a cell for various cell internal defects.

During the circuit design and manufacturing process, a manufacturing test screens out chips (dies) containing defects. The test itself, however, does not identify the reason for the unacceptable low or fluctuating yield that may be observed. Physical failure analysis (PFA) can inspect the faulty chip to locate the defect location(s) and to discover the root cause. The process usually includes etching away certain layers and then imaging the silicon surface by scanning electronic microscopy or focused ion beam systems. This PFA process is laborious and time consuming. To facilitate the PFA process, diagnosis (also referred to as scan diagnosis) is often employed to narrow down possible locations of the defect(s) based on analyzing the fail log (fail file, failure file). The fail log typically contains information about when (e.g., tester cycle), where (e.g., at what tester channel), and how (e.g., at what logic value) the test failed and which test patterns generate expected test responses. The layout information of the circuit design may also be employed to further reduce the number of defect suspects.

Test application in chip manufacturing test is normally performed by automatic test equipment (ATE) (a type of testers). Scan-based tests consume significant amounts of storage and test time on ATE. The data volume increases with the number of logic gates on the chip and the same holds for the number of scan cells. Yet, practical considerations and ATE specifications often limit both the number of pins available for scan in/out and the maximum scan frequency. It is highly desirable to reduce the amount of test data that need to be loaded onto ATE and ultimately to the circuit under test. Fortunately, test patterns are compressible mainly because only 1% to 5% of test pattern bits are typically specified bits (care bits) while the rest are unspecified bits (don't-care bits). Unspecified bits can take on any values with no impact on the fault coverage. Test compression may also take advantage of the fact that test cubes tend to be highly correlated. A test cube is a deterministic test pattern in which the don't-care bits are not filled by ATPG. The correlation exists because faults are structurally related in the circuit.

Various test compression techniques have been developed. In general, additional on-chip hardware before and after scan chains is inserted. The hardware (decompressor) added before scan chains is configured to decompress test stimulus coming from ATE, while the hardware (compactor) added after scan chains is configured to compact test responses captured by the scan chains. The decompressor expands the data from n tester channels to fill greater than n scan chains. The increase in the number of scan chains shortens each scan chain and thus reduces the number of clock cycles needed to shift in each test pattern. Thus, test compression can not only reduce the amount of data stored on the tester but also reduce the test time for a given test data bandwidth.

Decompressor for Embedded Deterministic Test (EDT)

Figure 2:
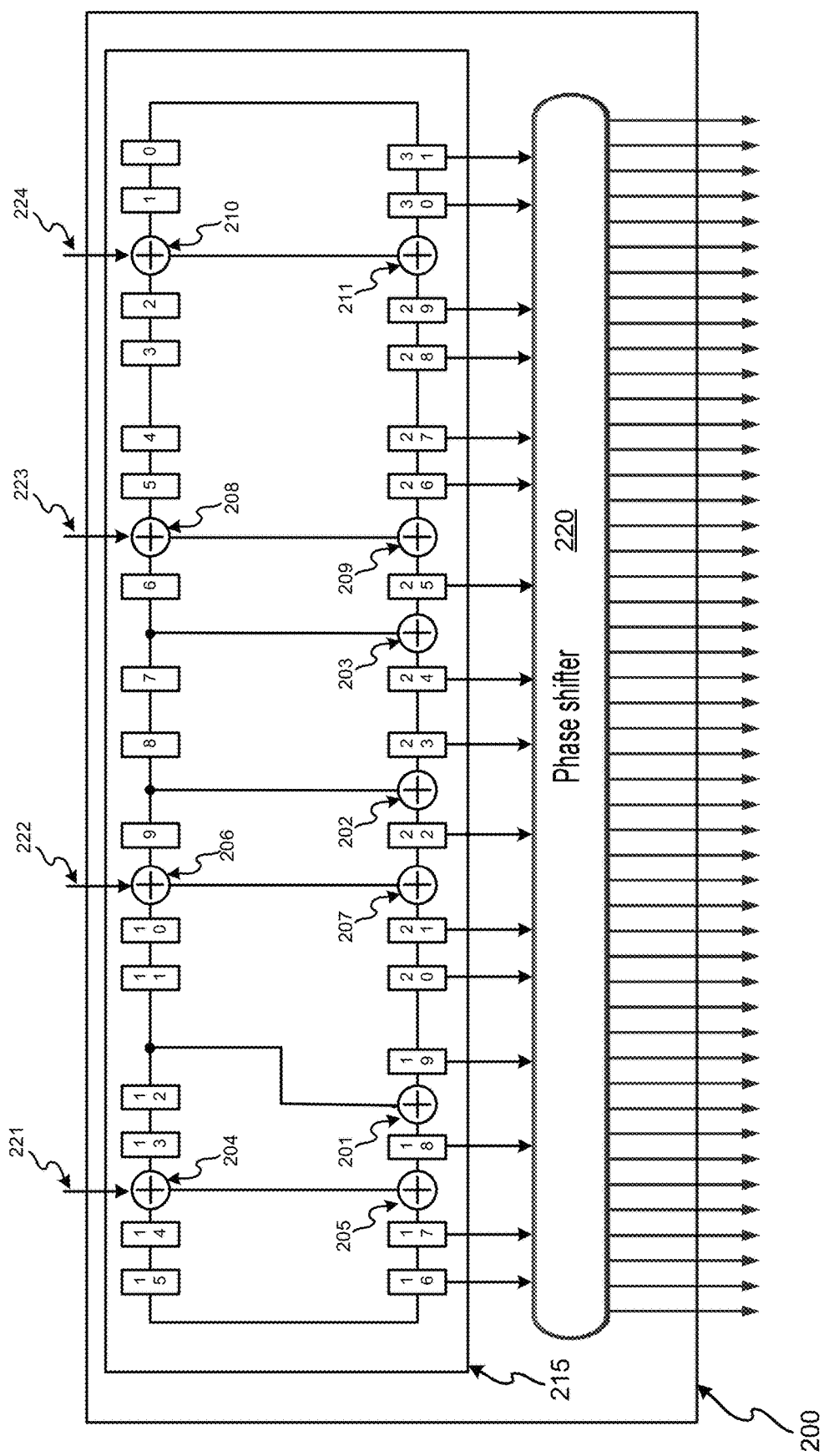
FIG. 2 illustrates an example of an example of an embedded deterministic test (EDT) decompressor.

The embedded deterministic test (EDT), one of the test compression techniques, is used as an example to describe the disclosed technology. The EDT-based compression comprises two complementary parts: hardware that is embedded on chip and deterministic ATPG software that generates compressed patterns that utilize the embedded hardware. The EDT hardware features a continuous-flow decompressor. FIG. 2 illustrates an example of EDT decompressor 200. The EDT decompressor 200 comprises a ring generator 215 and a phase shifter 220. The ring generator 215 is a distinct form of a linear finite state machine. It comprises thirty-two storage elements 0-31 such as flip-flops. These storage elements are often referred to as bits or register bits. The thirty-two storage elements are coupled to form a circular shift register. The ring generator 215 also comprises XOR gates 201-211. The XOR gates 201, 202 and 203 provide feedback paths; and the XOR gates 204-11 serve as injectors (also referred to as injection devices). Four input channels 221-224 supply variables to the XOR gates 204-205, 206-207, 208-209, and 210-211, respectively. The injector locations are selected to assure that test data can be quickly distributed to the entire ring generator 215, and hence provide encoding capacity for all scan chains.

Unlike conventional linear feedback shift registers (LFSRs), ring generators such as the ring generator 215 have reduced feedback logic since at most one two-input XOR gate is placed between any pair of storage elements. The maximum internal fan-out in a ring generator is limited to only two devices fed by any stem. The total length of feedback lines in a ring generator is also drastically reduced. Such short connections can prevent frequency degradation.

The phase shifter 220 comprises XOR gates. Each of the XOR gates has a limited number of inputs driven by a unique set of bits of the ring generator 215 and one output configured to drive a serial input of one of the scan chains. Three-input XOR gates are often used in a phase shifter to reduce propagation delays. For illustration only, FIG. 2 shows bits only bits 16-31 of the ring generator 215 being coupled to the phase shifter 220. In practice, all bits of the ring generator 215 can be used to drive the phase shifter 220.

At the beginning of loading every test pattern, the first group of data is shifted into the ring generator 215. These data are referred to as initial variables. Next, another group of variables is scanned in for decompression. Loading the scan chains is carried out in parallel with continuous injections of new variables into the ring generator 215. The total number of shift cycles is equal to the initial cycles plus the length of the longest scan chain.

Figure 3:
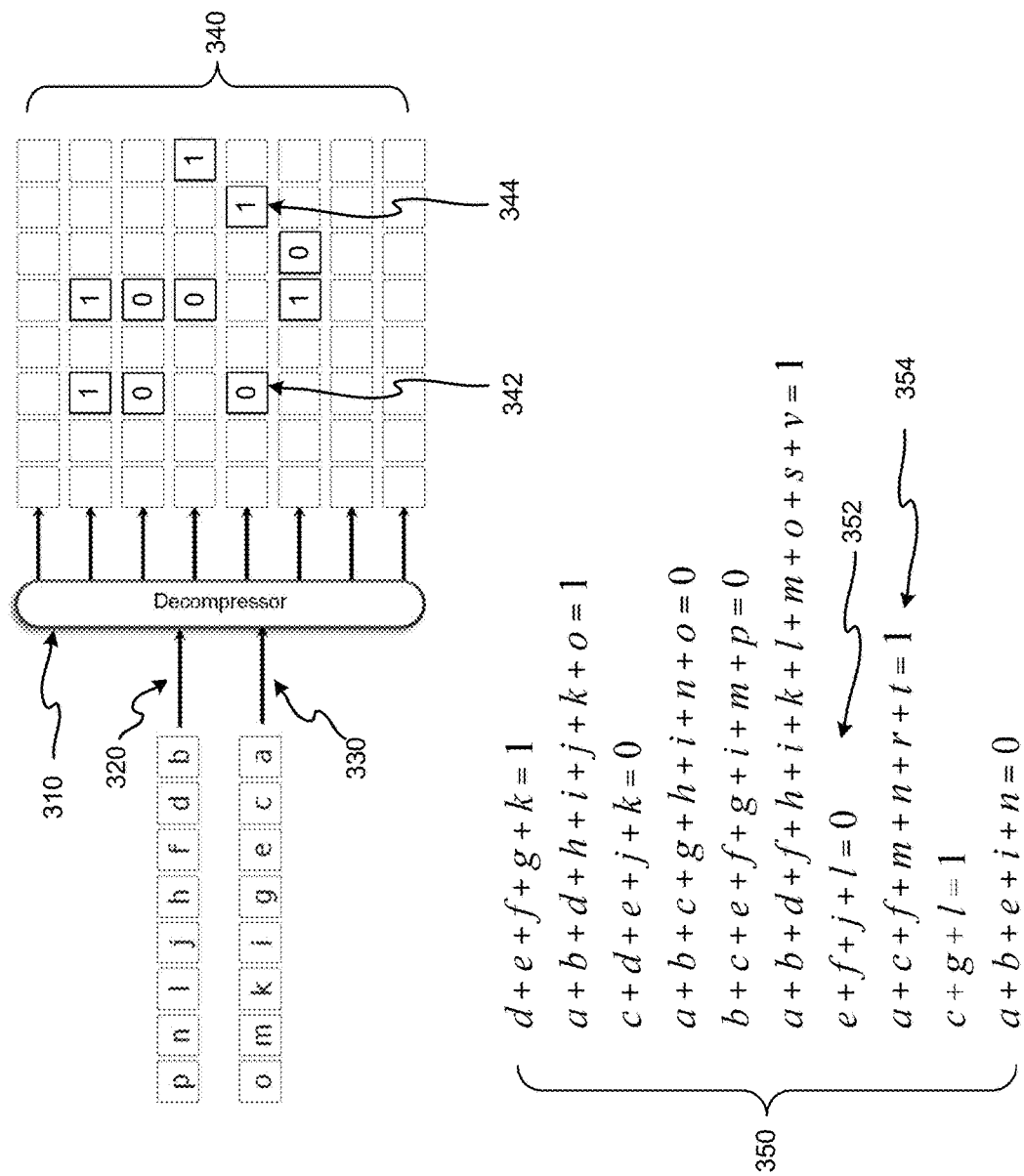
FIG. 3 illustrates an example of linear equations representing the relationship between variables injected into a decompressor and decompressed test stimuli loaded on scan chains.

FIG. 3 illustrates an example of linear equations 350 representing the relationship between variables injected into a decompressor 310 and decompressed test stimuli loaded on scan chains 340. The decompressor 310 has two input channels 320 and 330 for receiving variables to be injected and outputs decompressed test patterns to drive the scan chains 340. The system of linear equations 350 shows how the specified values are derived from the input variables. For example, equations 352 and 354 are associated with specified values "0" of bit 342 and "1" of bit 344 on one of the scan chains 340, respectively. When an ATPG tool produces a test cube with the specified bits shown as numbers in the scan chains 340 in FIG. 3, the system of linear equations 350 can be constructed based on the injectors for the decompressor 310, the polynomial functions associated with the ring generator in the decompressor 310, and the phase shifter in the decompressor 310. If the system of linear equations 350 can be solved, a compressed test pattern can be obtained. The compressed test pattern comprising the variables is scanned (injected) into the decompressor 310, the bits that were specified by the ATPG algorithm should match those scanned into the scan chains 340. Other unspecified bits are set when the decompressor 310 decompresses the resolved variables.

Additional details concerning EDT-based compression and decompression can be found in J. Rajski, J. Tyszer, M. Kassab, and N. Mukherjee, "Embedded deterministic test," IEEE Trans. CAD, vol. 23, pp. 776-792, May 2004, and U.S. Pat. Nos. 6,327,687; 6,353,842; 6,539,409; 6,543,020; 6,557,129; 6,684,358; 6,708,192; 6,829,740; 6,874,109;

7,093,175; 7,111,209; 7,260,591; 7,263,641; 7,478,296; 7,493,540; 7,500,163; 7,506,232; 7,509,546; 7,523,372; 7,653,851, of which all are hereby incorporated herein by reference.

All of the above mentioned processes, design insertion for testing, test pattern generation, and logic diagnosis, are normally performed by various electronic design automation tools such as those in the Tessent family of software tools available from Mentor Graphics Corporation, Wilsonville, Oreg.

Segmented Decompressor

Figure 4:
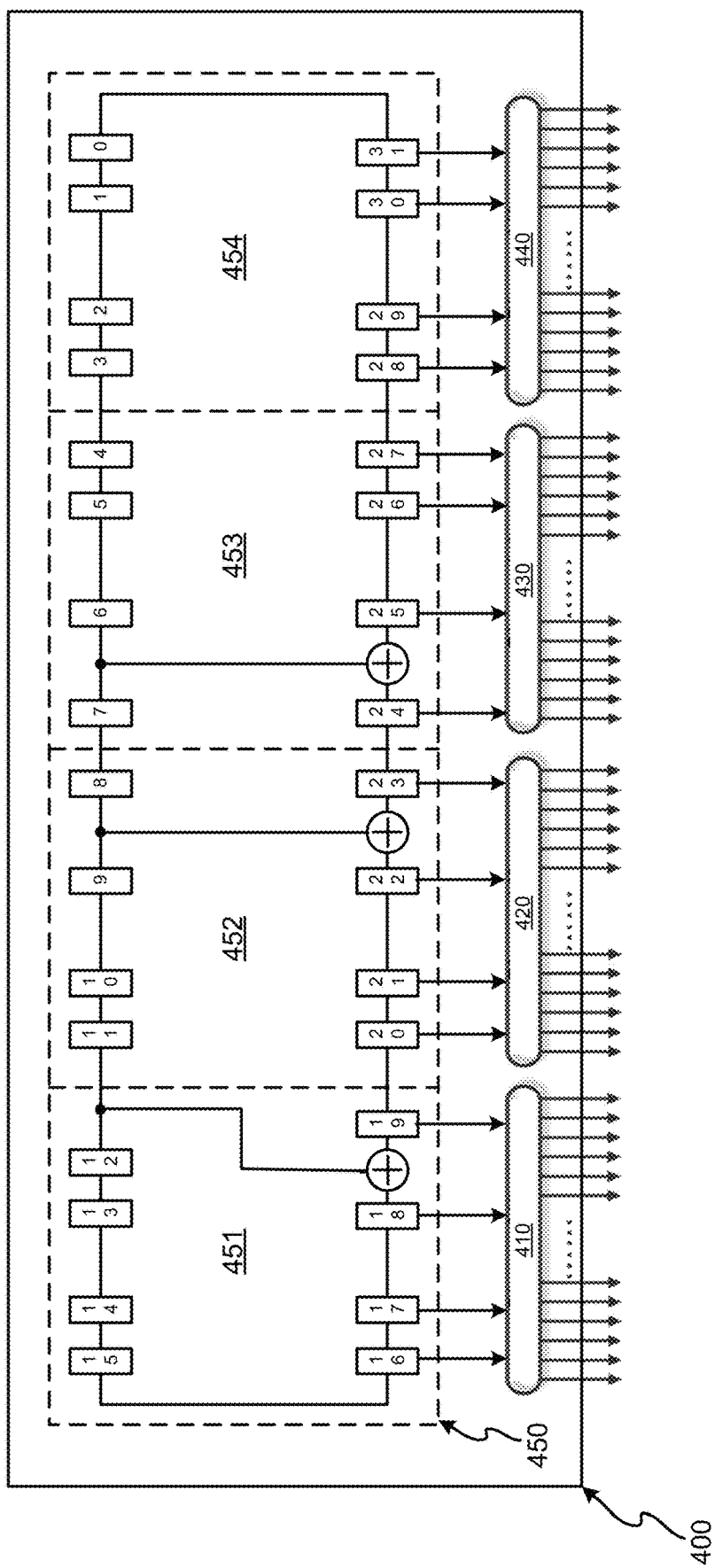
FIG. 4 illustrates an example of a segmented decompressor according to various embodiments of the disclosed technology.

As noted previously, a decompressor may cause routing congestion when it is used to drive thousands or even tens of thousands of scan chains. To reduce routing congestion, a decompressor can be partitioned into multiple segments with each segment driving one subset of the scan chains. FIG. 4 illustrates an example of a segmented decompressor 400 according to various embodiments of the disclosed technology. The segmented decompressor 400 is similar to the decompressor 200 shown in FIG. 2 but differs from it in two aspects. First, while the segmented decompressor 400 comprises a ring generator 450 like the decompressor 200, injection devices for the ring generator 450 are not shown. Second, the ring generator 450 is coupled to four small phase shifters 410-440 rather than a single big phase shifter. Each of the four phase shifters 410-440 receive signals from bits in a unique segment of the ring generator 450. As such, the ring generator 450 and the decompressor 400 can be considered to be partitioned into four segments 451-454 and four pairs of ring generator segment and phase shifter 410-451, 420-452, 430-453, and 440-454, respectively. This can reduce the routing congestion because different decompressor segments (pairs of ring generator segment and phase shifter) can drive scan chains in different parts of the layout.

If the injection devices of the decompressor 400 are inserted as the four pairs of XOR gates 204-205, 206-207, 208-209, and 210-211 in FIG. 2, the free variables injected from the input channels may not effectively provide encoding capacity to all of the scan chains. Assume, for example, that one of the injection device is between bit 13 and bit 12 of the ring generator 450. The variables injected through this injector will be shifted out of the segment 451 after just one clock cycle. Hence it may not help encoding the specified bits in scan chains driven by the phase shifter 410 after one cycle because this variable may already have been consumed by the other segments before it is looped back to the segment 451. To resolve this issue, where to and from which input channels to inject variables should be carefully designed to provide better encoding capacity to the scan chains.

Figure 5:
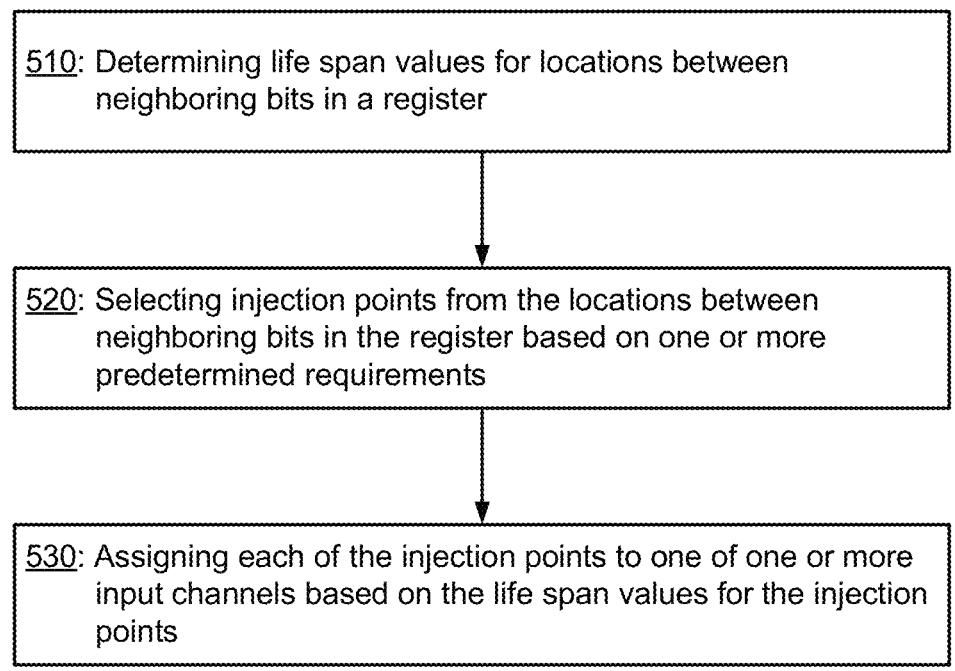
FIG. 5 illustrates a flowchart showing a process for determining injection points in a register for each input channel that may be implemented according to various examples of the disclosed technology.

FIG. 5 illustrates a flowchart 500 showing a process for determining injection points in a register for each input channel that may be implemented according to various examples of the disclosed technology. For ease of understanding, methods for determining injection points for each input channel that may be employed according to various embodiments of the disclosed technology will be described with reference to the ring generator 450 in FIG. 4 and the flow chart 500 illustrated in FIG. 5. It should be appreciated, however, that alternate implementations of a decompressor may be used to perform the methods for determining injection points each input channel illustrated by the flow chart 500 according to various embodiments of the disclosed technology. Likewise, the ring generator 450 may be employed to perform other methods for determining injection points each input channel according to various embodiments of the disclosed technology.

In operation 510, life span values are determined for locations between neighboring bits in a register. The register, comprising a plurality of storage elements (bits), is configured to be a linear finite state machine. It is a component of a decompressor. The decompressor also comprises a plurality of phase shifters of which each receives signals from bits in a unique segment of the register. Each of the phase shifters is configured to drive a subset of scan chains. The decompressor further comprises one or more input channels. The register comprises injection devices which receive variables from the one or more input channels, and one or more feedback devices which form feedback paths in the register. Each of the injection devices is inserted at a location between two neighboring bits. Such a location is referred to as an injection point.

Figure 6:
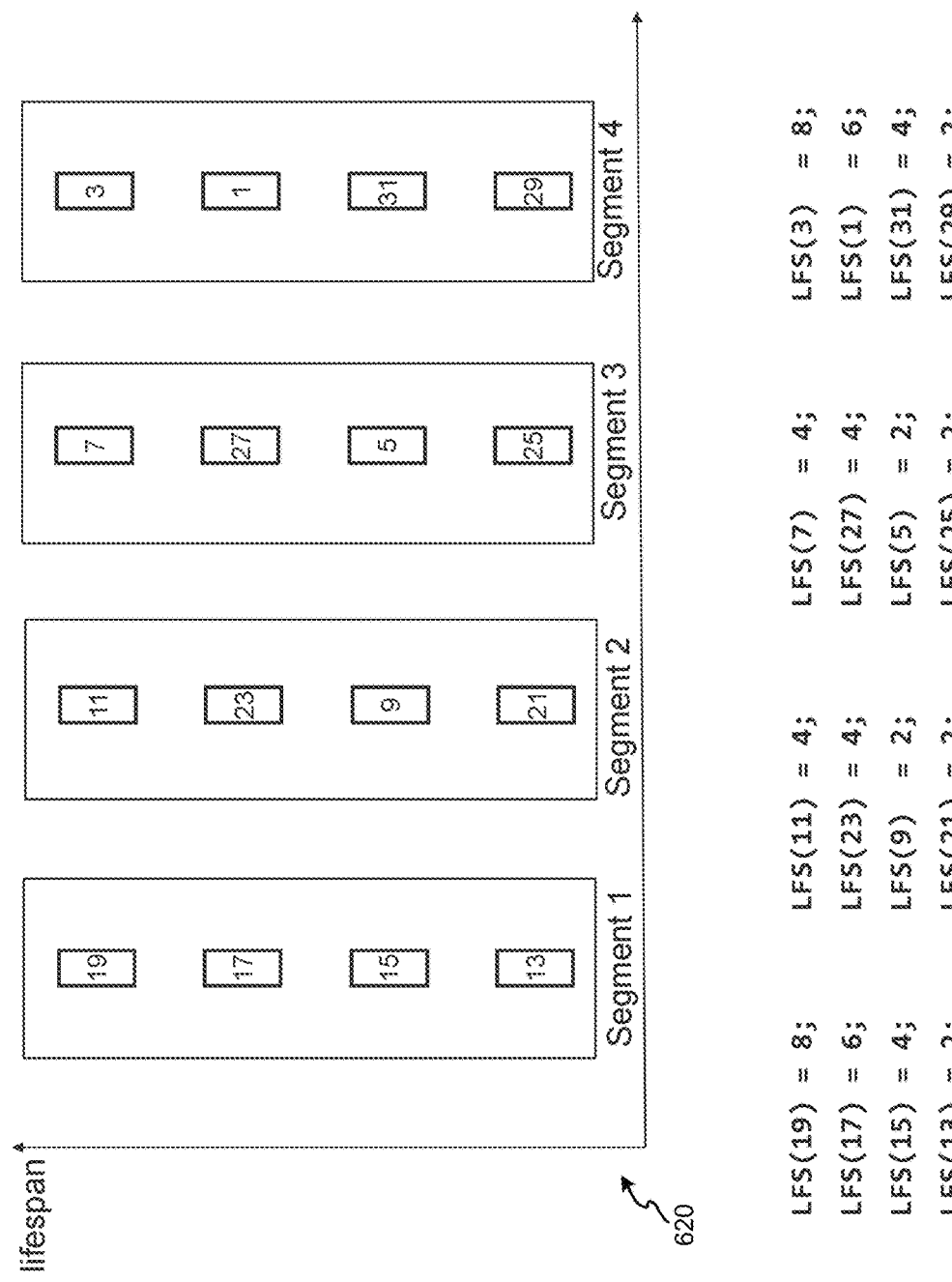
FIG. 6 illustrates an example of life span values for the injection points in a ring generator.

A life span value for a location between two neighboring bits in a specific segment of the register is defined as a number of clock cycles for which a variable injected at the location can provide encoding capacity to scan chains associated with the specific segment of the register before being shifted out of the specific segment of the register. Using the location between the bits 14 and 13 in the ring generator 450 as an example, a variable injected there will stay for two clock cycles in the segment 451 during which it can provide encoding capacity to the scan chains associated with this segment. Therefore, the life span value for this location can be assigned to be 2. The life span values for other locations between neighboring bits in the ring generator 450 can be similarly assigned. All of the life span values for the ring generator 450 are listed below (here, the location is represented by the downstream bit of the two neighboring bits sandwiching it):

In the segment 451: Life_Span(12)=1; Life_Span(13)=2; Life_Span(14)=3; Life_Span(15)=4; Life_Span(16)=5; Life_Span(17)=6; Life_Span(18)=7; Life_Span(19)=8;

In the segment 452: Life_Span(8)=1; Life_Span(9)=2; Life_Span(10)=3; Life_Span(11)=4; Life_Span(20)=1; Life_Span(21)=2; Life_Span(22)=3; Life_Span(23)=4;

In the segment 453: Life_Span(4)=1; Life_Span(5)=2; Life_Span(6)=3; Life_Span(7)=4; Life_Span(24)=1; Life_Span(25)=2; Life_Span(26)=3; Life_Span(27)=4;

In the segment 454: Life_Span(28)=1; Life_Span(29)=2; Life_Span(30)=3; Life_Span(31)=4; Life_Span(0)=5; Life_Span(1)=6; Life_Span(2)=7; Life_Span(3)=8;

In operation 520, injection points (i.e., locations for inserting injection devices) are selected from the locations between neighboring bits in the register based on one or more predetermined requirements. One of the predetermined requirements may be that a feedback device and an injection device should not be located at the same location between two neighboring bits of the register. An additional or alternative requirement may be that any two of the injection devices should be separated by at least two neighboring bits of the register. Under these two requirements, the injection points for the ring generator 450 are locations between bits (20, 19), (18, 17), (16, 15), (14, 13), (12, 11), (10, 9), (8, 7), (6, 5), (4, 3), (2, 1), (0, 31), (30, 29), (28, 27), (26, 25), (24, 23), and (22, 21). FIG. 6 illustrates the life span values 610 for these injection points. In the figure, the injection points are represented by the downstream bit of the two neighboring bits.

In operation 530, each of the injection points is assigned to one of the input channels based on the life span values for the injection points. The number of injection points for a segment may be set to be proportional to the size of the segment. For example, if the segments are equal in size, each input channel can be connected to either floor(T/C) or floor(T/C)+1 injection devices, where T represents the number of the injection points and C represents the number of input channels.

The injection points or the injection devices inserted at the injection points can be organized in a two-dimensional map based on the ranking of the life span values for the injection points in each segment of the register. FIG. 6 illustrates an example of a two-dimensional map 620 for the ring generator 450. Based on the two-dimensional map 620, each of the injection points can be assigned to one of the input channels. According to some embodiments of the disclosed technology, the assignment may be derived based on two objectives: Each segment of the register should receive the same, or similar, number of different input channels; and each input channel should be associated with a group of injection points with a mix of life span values from long to short. FIG. 7 illustrates an example of a pseudo code for assigning the injection points to the input channels that may be employed according to various examples of the disclosed technology.

Figure 8A:
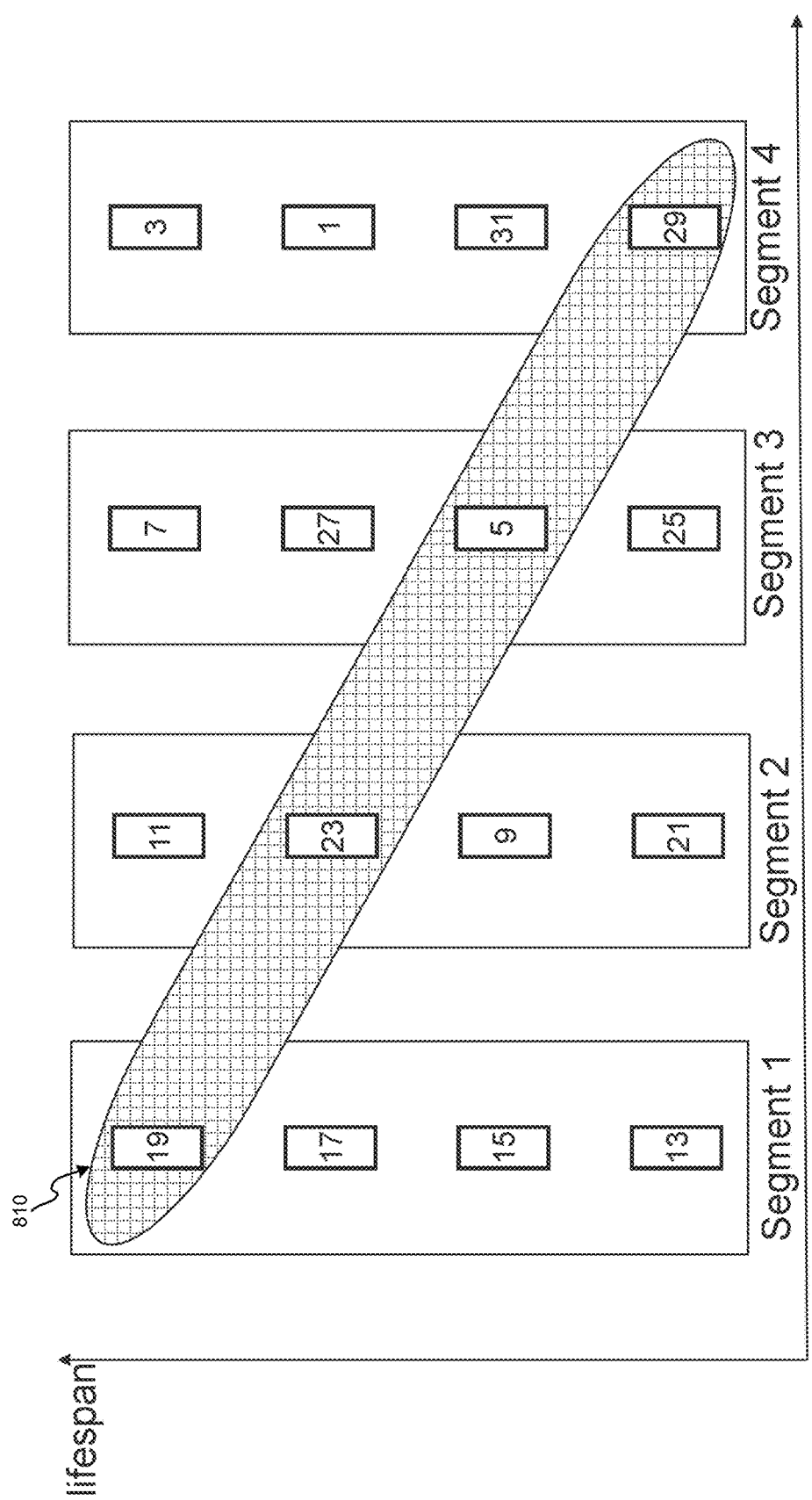
FIG. 8A illustrates an example of an assignment of injection points to the first input channel when the number of input channels is equal to the number of segments of the register.

Assume the ring generator 450 has four input channels. Here, the total number of the injection devices is 16. Thus, each input channel can be coupled to four of the injection devices. FIG. 8A illustrates an example of an assignment of the injection points to the first channel 810. As seen from the figure, the injection points assigned to the first channel 810 are the injection point 19 with the greatest life span value in the segment 1, the injection point 23 with the second greatest life span value in the segment 2, the injection point 5 with the third greatest life span value in the segment 3, and the injection point 29 with the smallest life span value in the segment 4.

Figure 8B:
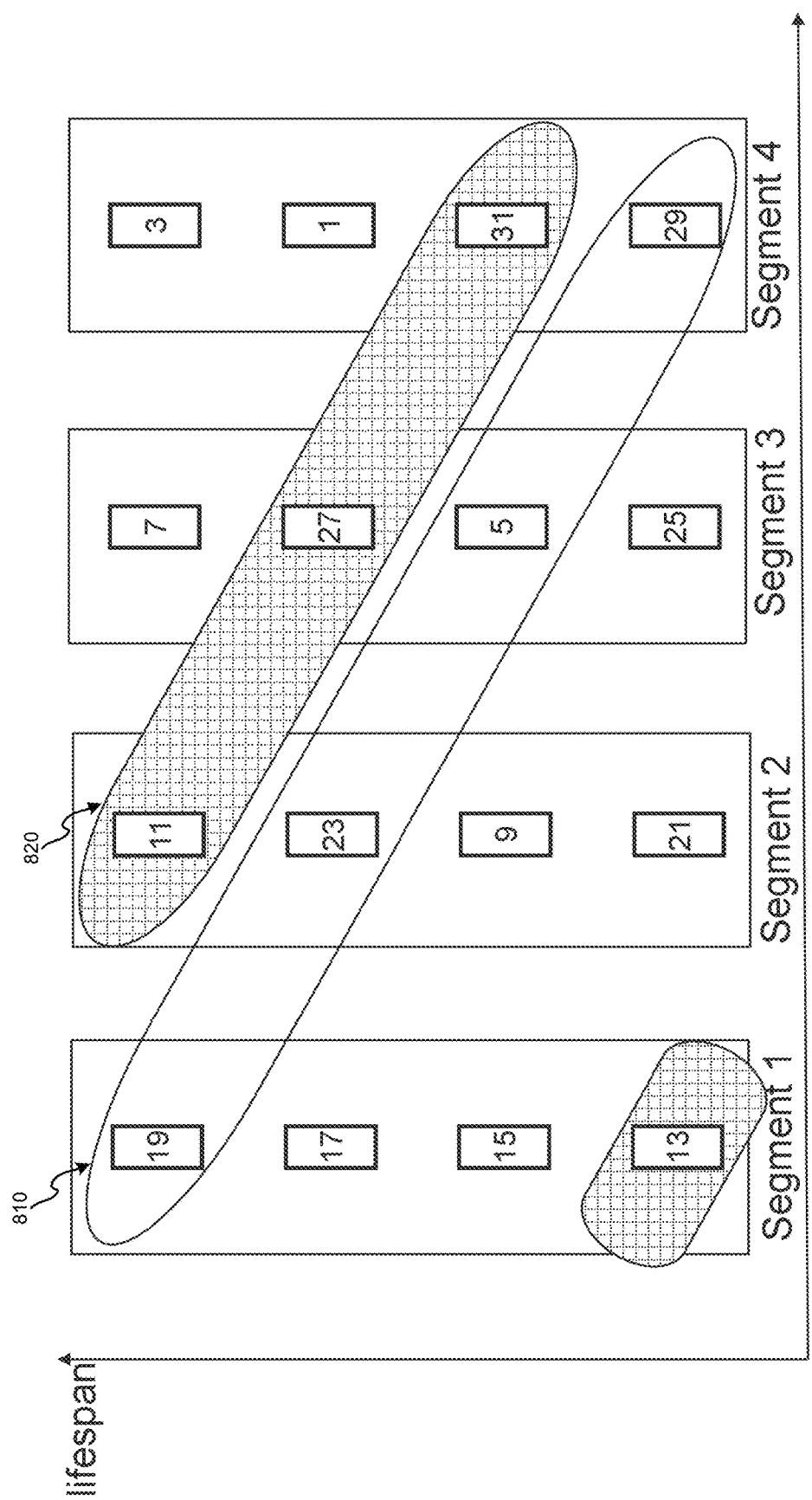
FIG. 8B illustrates an example of an assignment of the injection points to the second channel when the number of input channels is equal to the number of segments of the register.

FIG. 8B illustrates an example of an assignment of the injection points to the second channel 820. As seen from the figure, the injection points assigned to the second channel 820 are the injection point 11 with the greatest life span value in the segment 2, the injection point 27 with the second greatest life span value in the segment 3, the injection point 31 with the third greatest life span value in the segment 4, and the injection point 13 with the smallest life span value in the segment 1.

Figure 8C:
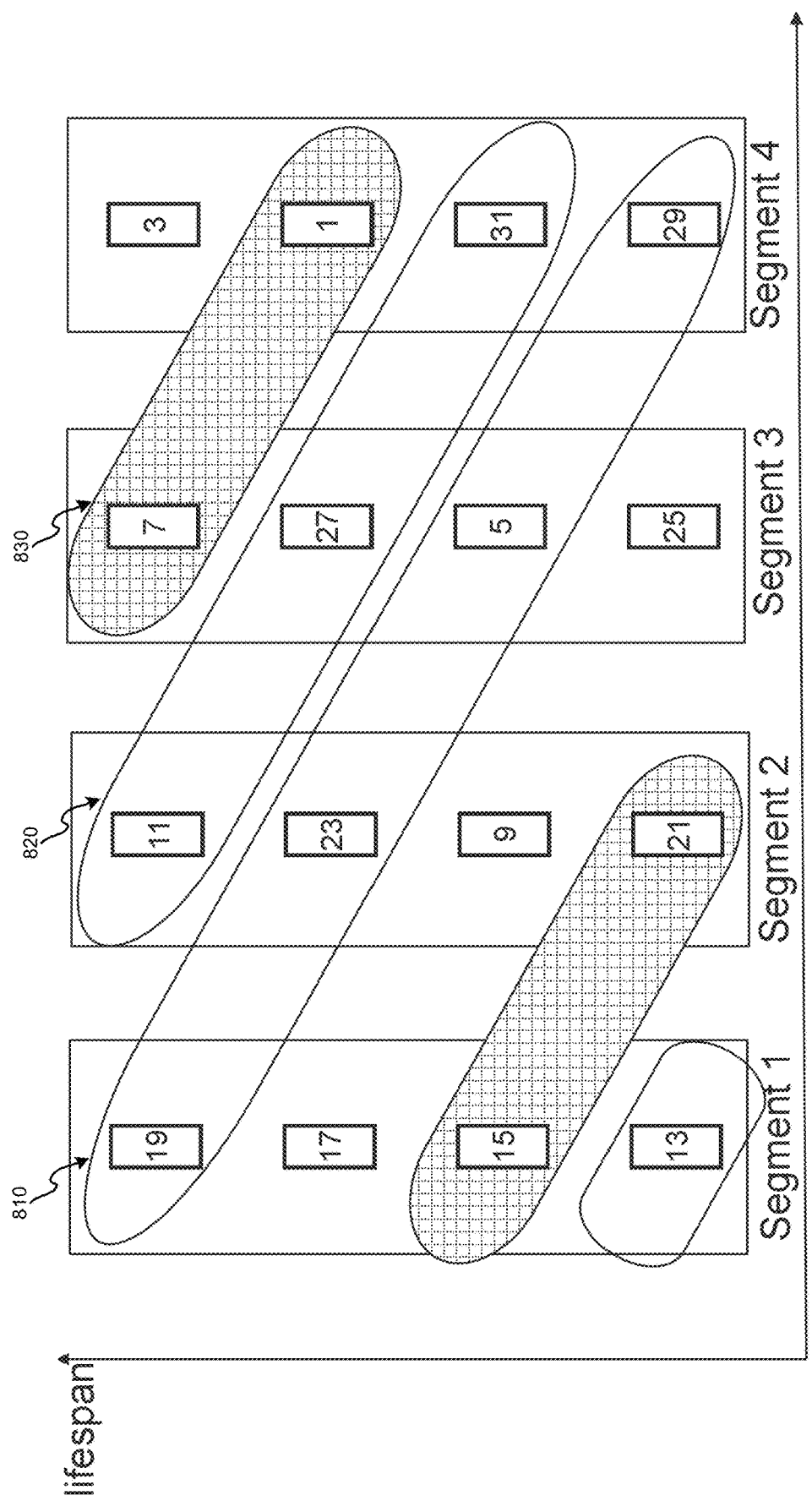
FIG. 8C illustrates an example of an assignment of injection points to the third input channel when the number of input channels is equal to the number of segments of the register.

FIG. 8C illustrates an example of an assignment of the injection points to the third channel 830. As seen from the figure, the injection points assigned to the third channel 830 are the injection point 7 with the greatest life span value in the segment 3, the injection point 1 with the second greatest life span value in the segment 4, the injection point 15 with the third greatest life span value in the segment 1, and the injection point 21 with the smallest life span value in the segment 2.

Figure 8D:
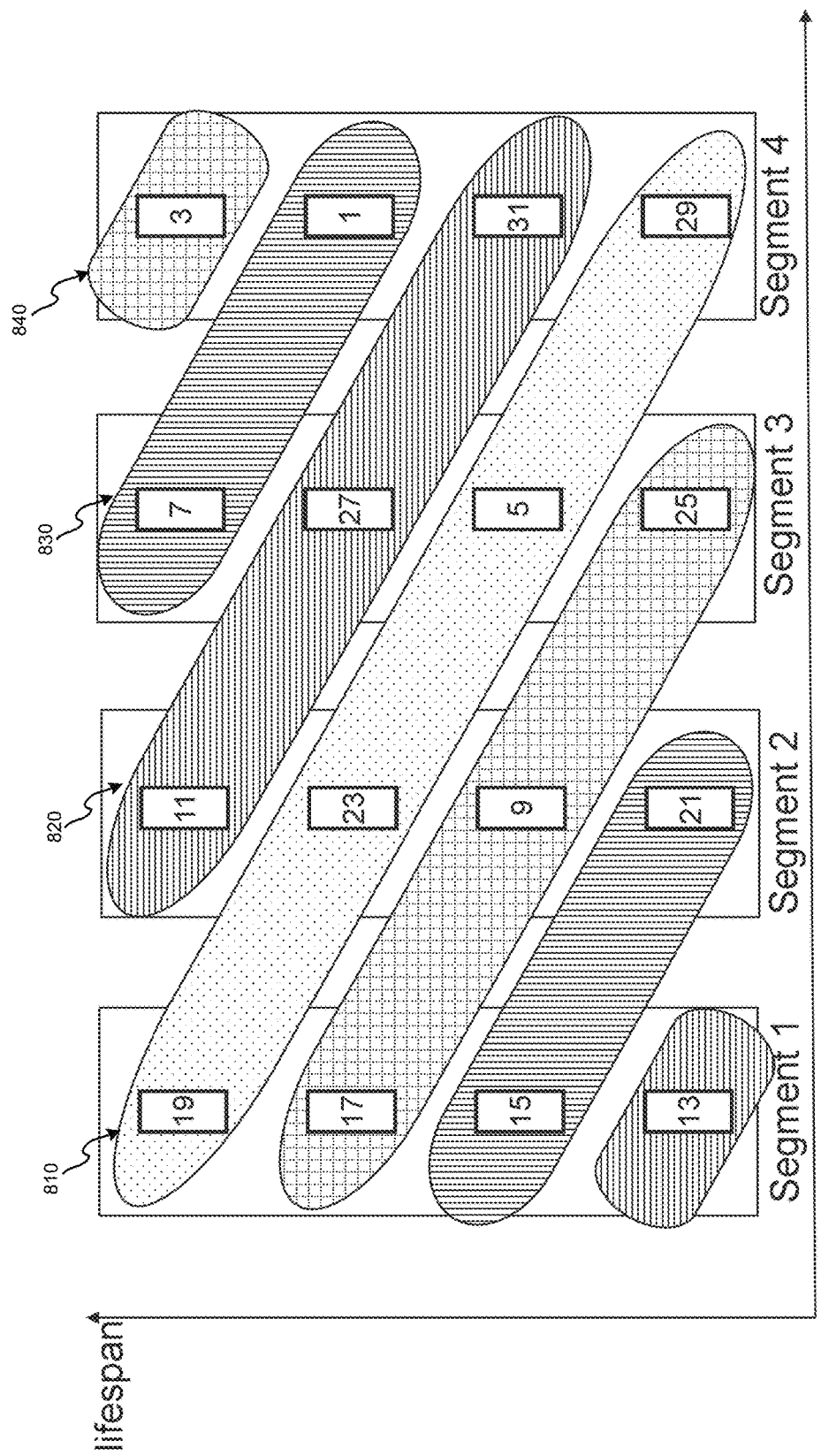
FIG. 8D illustrates an example of an assignment of injection points to the fourth input channel when the number of input channels is equal to the number of segments of the register.

FIG. 8D illustrates an example of an assignment of the injection points to the fourth channel 840. As seen from the figure, the injection points assigned to the fourth channel 840 are the injection point 3 with the greatest life span value in the segment 4, the injection point 17 with the second greatest life span value in the segment 1, the injection point 9 with the third greatest life span value in the segment 2, and the injection point 25 with the smallest life span value in the segment 3. The process illustrates by FIGS. 8A-8D can lead to an allocation that distributes injected variables into different segments in a balanced manner in terms of total life span values, maximizing the encoding capacity for each individual segment.

Figure 9:
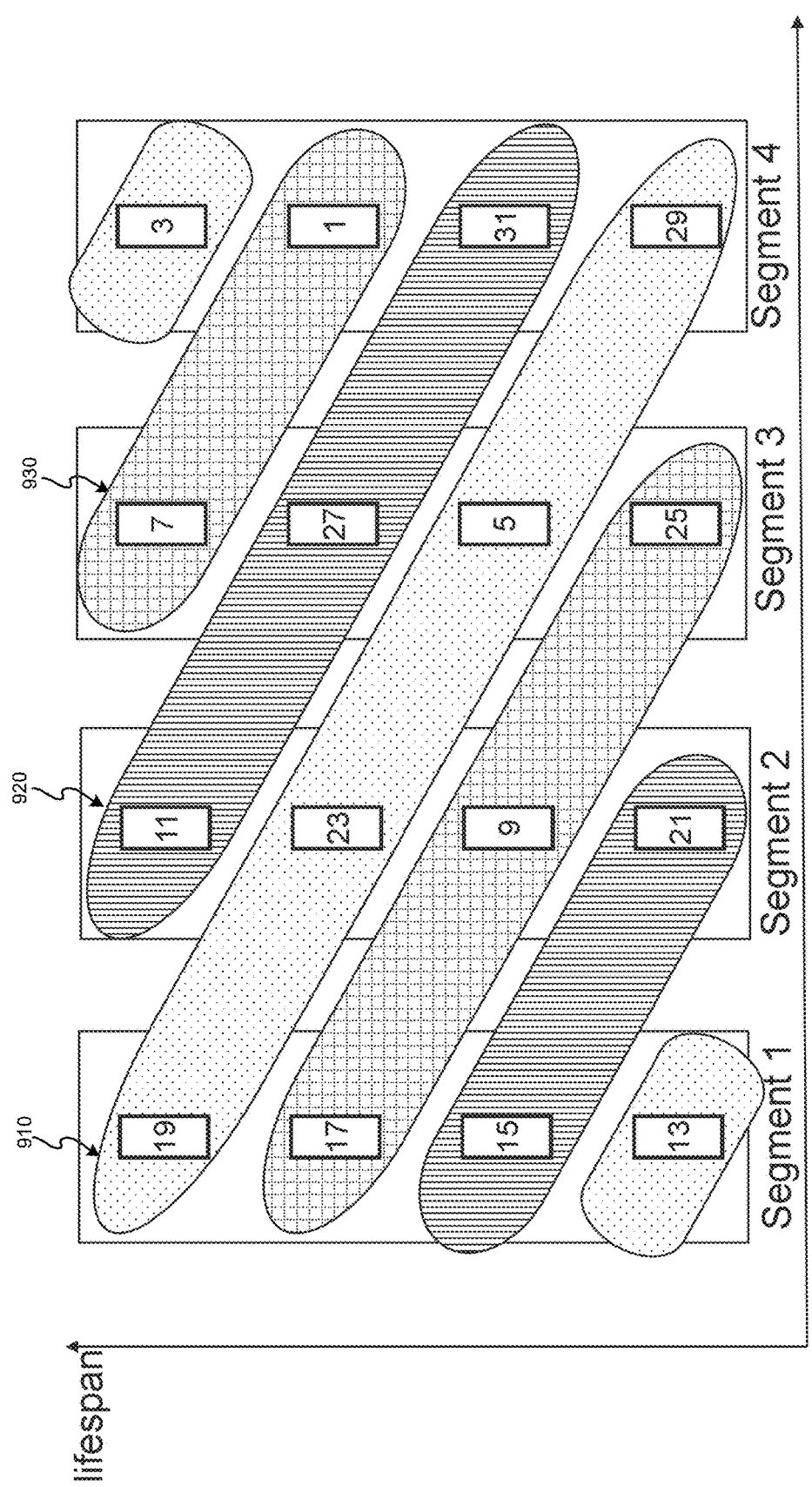
FIG. 9 illustrates an example of an assignment of injection points to input channel when the number of input channels is less than the number of segments of the register.

If the number of input channels (N) is less than the number of segments (5), the first channel can start at segment 1, 1+N, 1+2N . . . , the second channel can start at segment 2, 2+N, 2+2N . . . , and so on. An example is illustrated in FIG. 9. Here, the ring generator 450 has 3 input channels in total and 4 segments with 16 injection points. The second channel 920 and the third channel 930 both are coupled to 5 injectors each, whereas the first channel 910 is coupled to 6 injectors.

Figure 10:
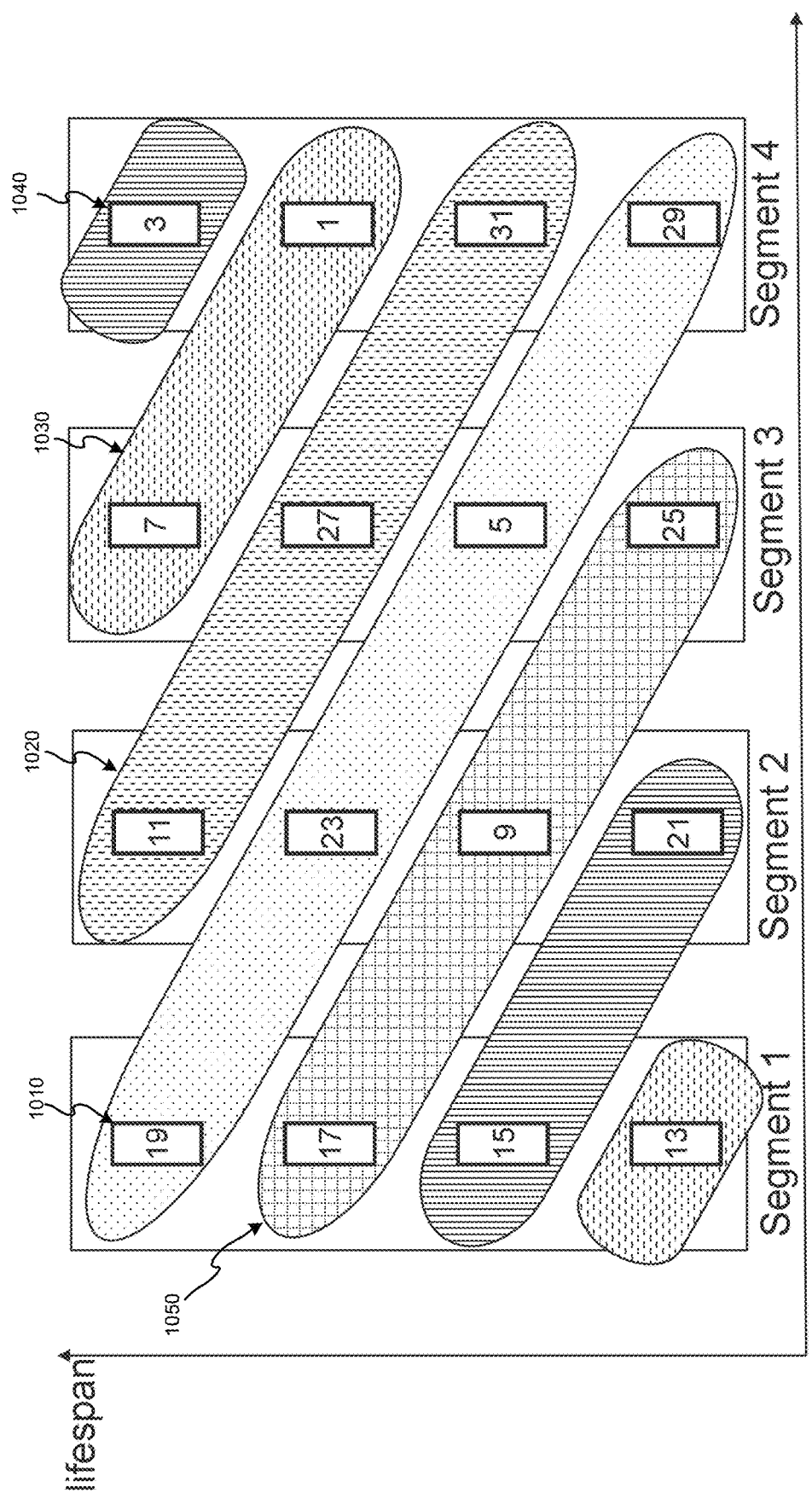
FIG. 10 illustrates an example of an assignment of injection points to input channel when the number of input channels is greater than the number of segments of the register.

If the number of input channels (N) is more than the number of total segments (5), the input channels may be traversed with one injector in each segment being assigned to one input channel. After the injectors in one row have been assigned, the injectors in the second row are assigned to the rest of the input channels. Then the second round starts. FIG. 10 illustrates an example of an assignment for the ring generator 450 having 5 input channels and 4 segments with 16 injectors. Each of the four input channels 1020-1050 is coupled to 3 injectors, whereas the input channel 1010 is coupled to 4 injectors.

If a decompressor has separated control data channels, the injectors may not be distributed evenly among all input channels because data channels can, in general, provide more variables than control channels.

FIG. 11 illustrates a table listing parameters for nine industrial designs, including information about the total number of gates, the total number of scan cells, the input/output EDT channels, the total number of scan chains, average scan chain length, and the input compression ratio (#scan chains/#input channels). FIG. 12 illustrates ATPG results for each of the nine industrial designs. On average, the layout-friendly segmented decompressor has negligible test coverage drop of 0.01% with pattern count reduced by 5%. In the meantime, the layout results (not illustrated here) indicate that the layout-friendly decompressor has almost 2× reduction on the over-congested edges and 1.35× reduction on the worst over-congestion number.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. A circuit, comprising:
   a register configured to be a linear finite state machine and comprising storage elements, injection devices, one or more input channels for injecting variables using the injection devices, and one or more feedback devices;
   a plurality of phase shifters, each of the plurality of phase shifters configured to receive signals from a unique segment of the register;
   scan chains, serial inputs of the scan chains configured to receive signals from outputs of the plurality of phase shifters,
   wherein the one or more input channels are coupled to the injection devices at injection points in the register, each of the injection points being assigned to one of the one or more input channels based on lifespan values for the injection points, the injection points being determined based on one or more predetermined requirements, a life span value for an injection point in a specific segment of the register being a number of clock cycles for which a variable injected at the injection point can provide encoding capacity to scan chains associated with the specific segment of the register before being shifted out of the specific segment of the register.

2. The circuit recited in claim 1, wherein the register is a ring generator.

3. The circuit recited in claim 1, wherein at least one segment of the register providing signals to a phase shifter in the plurality of phase shifters contains two groups of bits, bits in each of the two groups of storage elements forming a shift register, the shift register having one or more of the injection points, one or more points for inserting the feedback devices, or both.

4. The circuit recited in claim 1, wherein the one or more predetermined requirements comprise: a requirement that a feedback device and an injection device should not be located at the same location between two neighboring storage elements of the register, a requirement that any two of the injection devices should be separated by at least two neighboring storage elements of the register, or both.

5. The circuit recited in claim 1, wherein the injection points in each segment of the register are assigned to different input channels if a number of the injection points in the each segment of the register is less than or equal to a number of the one or more input channels, or each of the one or more input channels is assigned to at least one of the injection points in each segment of the register if the number of the injection points in the each segment of the register is greater than the number of the one or more input channels.

6. The circuit recited in claim 1, wherein the assignment of the injection points to the one or more input channels employs a diagonal search method on a two-dimensional map which groups the injection points in each of the segments of the register in one of columns or rows of the two-dimensional map, the injection points in each of the columns or rows being ordered according to the life span values of the injection points.

7. The circuit recited in claim 1, wherein each of the one or more input channels is assigned to at least one of the injection points in each segment of the register, and sums of the life span values for the injection points are equal for the one or more input channels.

8. The circuit recited in claim 1, wherein the injection devices and the feedback devices are XOR gates.

9. The circuit recited in claim 1, wherein each of the plurality of phase shifters comprises XOR gates.

10. One or more non-transitory computer-readable media storing computer-executable instructions for causing a computer to perform a method, the method comprising:
creating a circuit in a circuit design for testing a chip fabricated according to the circuit design, the circuit comprising:
a register configured to be a linear finite state machine and comprising storage elements, injection devices, one or more input channels for injecting variables using the injection devices, and one or more feedback devices;
a plurality of phase shifters, each of the plurality of phase shifters configured to receive signals from a unique segment of the register;
scan chains, serial inputs of the scan chains configured to receive signals from outputs of the plurality of phase shifters,
wherein the one or more input channels are coupled to the injection devices at injection points in the register, each of the injection points being assigned to one of the one or more input channels based on lifespan values for the injection points, the injection points being determined based on one or more predetermined requirements, a life span value for an injection point in a specific segment of the register being a number of clock cycles for which a variable injected at the injection point can provide encoding capacity to scan chains associated with the specific segment of the register before being shifted out of the specific segment of the register.

11. The one or more non-transitory computer-readable media recited in claim 10, wherein the register is a ring generator.

12. The one or more non-transitory computer-readable media recited in claim 10, wherein at least one segment of the register providing signals to a phase shifter in the plurality of phase shifters contains two groups of bits, bits in each of the two groups of storage elements forming a shift register, the shift register having one or more of the injection points, one or more points for inserting the feedback devices, or both.

13. The one or more non-transitory computer-readable media recited in claim 10, wherein the one or more predetermined requirements comprise: a requirement that a feedback device and an injection device should not be located at the same location between two neighboring storage elements of the register, a requirement that any two of the injection devices should be separated by at least two neighboring storage elements of the register, or both.

14. The one or more non-transitory computer-readable media recited in claim 10, wherein the injection points in each segment of the register are assigned to different input channels if a number of the injection points in the each segment of the register is less than or equal to a number of the one or more input channels, or each of the one or more input channels is assigned to at least one of the injection points in each segment of the register if the number of the injection points in the each segment of the register is greater than the number of the one or more input channels.

15. The one or more non-transitory computer-readable media recited in claim 10, wherein the assignment of the injection points to the one or more input channels employs a diagonal search method on a two-dimensional map which groups the injection points in each of the segments of the register in one of columns or rows of the two-dimensional map, the injection points in each of the columns or rows being ordered according to the life span values of the injection points.

16. The one or more non-transitory computer-readable media recited in claim 10, wherein each of the one or more input channels is assigned to at least one of the injection points in each segment of the register, and sums of the life span values for the injection points are equal for the one or more input channels.

17. The one or more non-transitory computer-readable media recited in claim 16, wherein the injection devices and the feedback devices are XOR gates.

18. The one or more non-transitory computer-readable media recited in claim 10, wherein each of the plurality of phase shifters comprises XOR gates.

* * * * *